US007275641B1

(12) United States Patent
Purnell

(10) Patent No.: US 7,275,641 B1

(45) Date of Patent: Oct. 2, 2007

(54) TOOL AND SMALL ITEM ORGANIZER AND CONTAINER

(76) Inventor: Robert E. Purnell, 961 Hebron Rd., Shelbyville, KY (US) 40065

( * ) Notice: Subject to any disclaimer, the term of this patent is extended or adjusted under 35 U.S.C. 154(b) by 316 days.

(21) Appl. No.: 10/842,340

(22) Filed: May 10, 2004

Related U.S. Application Data

(63) Continuation-in-part of application No. 10/152,768, filed on May 22, 2002, now abandoned.

(51) Int. Cl.

| | |
|---|---|
| ***B65D 85/28*** | (2006.01) |
| ***B65D 25/24*** | (2006.01) |
| ***B65D 43/20*** | (2006.01) |
| ***B65D 51/04*** | (2006.01) |
| ***B60R 7/00*** | (2006.01) |

(52) U.S. Cl. ...................... 206/373; 220/480; 220/812; 220/826; 220/841; 224/401; 224/42.33

(58) Field of Classification Search ........ 206/372–379, 206/349; 220/475, 476, 480, 811, 812, 826, 220/841, 345.1, 345.4, 345.5, 351; 224/400, 224/401, 42.32, 42.33, 545; 182/129
See application file for complete search history.

(56) References Cited

U.S. PATENT DOCUMENTS

| | | | | |
|---|---|---|---|---|
| 1,597,092 | A * | 8/1926 | McTighe | 220/812 |
| 3,831,805 | A * | 8/1974 | Yonce | 220/771 |
| 4,058,210 | A * | 11/1977 | Mitchell | 206/372 |
| 4,140,256 | A * | 2/1979 | King | 206/373 |
| 4,303,158 | A * | 12/1981 | Perkins | 206/373 |
| 4,768,652 | A * | 9/1988 | Fallon | 206/373 |
| 2003/0098313 | A1* | 5/2003 | Cheng | 220/840 |
| 2006/0021985 | A1* | 2/2006 | Jasper | 220/475 |

FOREIGN PATENT DOCUMENTS

FR 2642406 A1 * 8/1990

* cited by examiner

*Primary Examiner*—Mickey Yu
*Assistant Examiner*—Greg Pickett
(74) *Attorney, Agent, or Firm*—Stites & Harbison, PLLC; John E. Vanderburgh

(57) ABSTRACT

An organizer for securely retaining hand tools and other miscellaneous small items particularly in environments where space for working is limited and the tools must be organized and conveniently available. The organizer includes a container defining an interior in which is disposed a support plate having openings adapted for the insertion and support of various items such as hand tools and a bottom wall for supporting the lower ends of those items that extend through the support plate and are long enough to reach the bottom wall. For even longer items the bottom wall is provided with one or more openings of sufficient size to allow the item to extend through the bottom wall. The support panel may be hinged for pivoting to an open position to provide access to the interior for tool storage. Either the top wall or the front wall of the organizer are adapted to be opened and retracted for access to the interior and support plate of the organizer.

7 Claims, 9 Drawing Sheets

TOOL AND SMALL ITEM ORGANIZER AND CONTAINER

This application is a continuation-in-part of application Ser. No. 10/152,768, filed May 22, 2002 now abandoned, entitled TOOL AND SMALL ITEM ORGANIZER AND CONTAINER which is incorporated by reference herein.

FIELD OF THE INVENTION

This invention relates to an organizer for tools and other small items and more particularly to an organizer for use in the bucket of aerial ladder booms.

BACKGROUND OF THE INVENTION

Securing and storing tools and miscellaneous hard goods where they are conveniently available to a worker on the job can oftentimes present a problem as well as present a safety hazard. This can be a particularly serious problem when the worker is in a confined space such as when working in the bucket of an aerial lift boom. Aerial lift booms are conventionally carried on a truck or similar wheeled motor driven chassis and are widely used in the construction trades, utility repair, tree surgery and other similar areas that require access to carry out work in places that may or may not be reached by a ladder. Aerial lift booms are more convenient and more efficient than ladders for use in locations to which the chassis can be moved.

The bucket in which the worker stands or sits is restricted in size and provides only a limited floor area on which to store parts and unused tools. In addition, the bucket, being at the end of the boom, can be unsteady and the presence of items on the floor of the bucket may present a hazard to the occupant. On occasion the occupant of the bucket will wear a tool belt for securing small tools. However, even a tool belt can be an impediment to the occupant of the bucket.

Several U.S. patents describe methods and apparatus for holding large tools in the bucket of a boom lift. For example, U.S. Pat. No. 4,194,713, Johnson-, describes a tool holder that is secured to the boom lift bucket. The tool holder consists of a bent flexible plate and a tool holding strap extending between opposite edges of the plate. The tool holder is designed to hold elongated tools such as poles and remote mount saws and the like. U.S. Pat. No. 5,878,837, Kistner, also relates to a tool holder for securing elongated tools on the boom lift bucket. The tool holder is clamped to the upper side edge of the bucket and includes pivotal clamping apparatus for holding the tools. In this manner, the elongated tool can be clamped to the bucket when it is lowered and the tool is lying on the ground. As the bucket lifts the tool, it gradually pivots so that it is safely hanging vertically on the exterior of the bucket.

The foregoing patents are not concerned with the securing and organizing small tools and miscellaneous small items that, if loose on the floor of the bucket, can become a hazard to a person in the bucket. At the least, such loose small tools represent an inconvenience for the worker as there is no convenient place to store small tools in the bucket until they are needed.

U.S. Pat. No. 5,261,556, Gatto, relates to a modular tool and hard goods organizer and storage unit for converting the interior of a pail or 5 gallon bucket into a storage unit for such items. This device is unsuited for use in a boom lift bucket since a pail on the floor of the boom lift bucket can interfere with the footing of a worker in the boom lift bucket and thus constitute a hazard.

Containers for boom lift buckets have been used in the field; however, these containers are essentially boxes that are open at the top. Tools and other items are held in the box in a random, unorganized manner. A worker is forced to sort through the items in the box to find the tool or other needed items.

Similar problems are presented in underwater construction and repair projects where a diver requires an assortment of tools to be ready at hand when needed.

SUMMARY OF THE INVENTION

The invention relates to an organizer for securely retaining hand tools and other miscellaneous small items particularly in environments where space for working is limited and the tools must be organized and conveniently available. The organizer of the present invention will be described hereinafter in connection with use in the bucket of a boom lift. However, it will be understood that the organizer is useful in any situation where tools and other items must be secured and organized for convenient availability, particularly where the work area is somewhat confined.

More particularly the organizer comprises top, front, rear and side faces closed by panels to define top, front, rear and side walls respectively and a bottom wall. The top, front, rear and side walls each define transverse edges and side edges. The bottom wall cooperates with the top, front, rear and side walls to define a container having an interior and a support plate defining an upper and a lower face is disposed in the interior of the container in spaced relationship to the bottom wall for supporting tools and hard goods in an organized and secure manner. At least one of the top or front walls are adapted for movement between a closed position over the top and front face of the container and an open position thereby to expose either the top face or the front face for access into said interior of said container.

In another aspect of the invention the support plate is adapted for hinged attachment in the container for pivotal movement into an essentially vertical position to provide access to the bottom wall of the container for storage of tools and the like when not being used.

DESCRIPTION OF THE PREFERRED EMBODIMENTS

Figure 1:
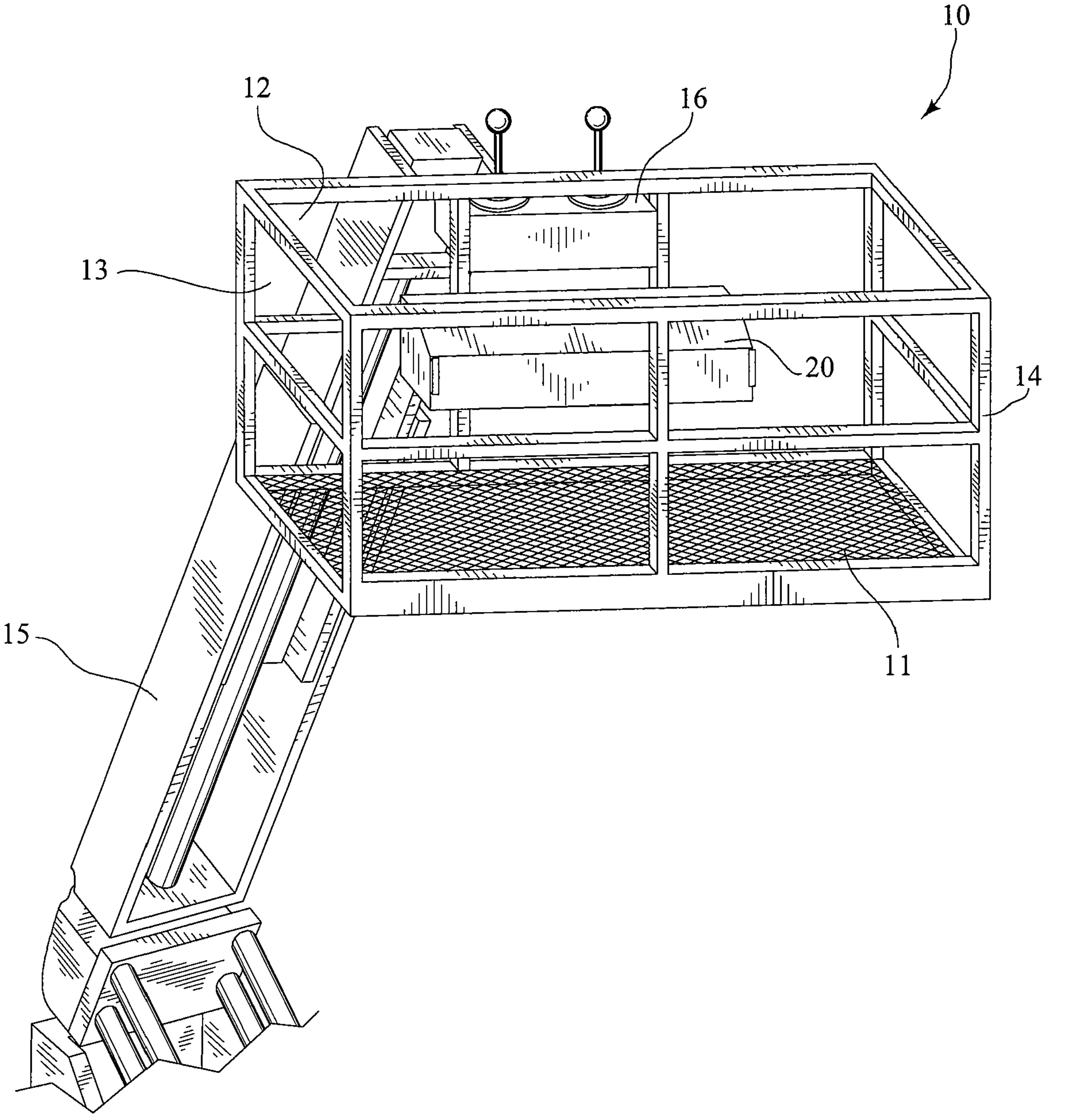
FIG. 1 is a perspective view of a portion of a lift boom carrying a bucket having a tool organizer attached thereto.

Referring to FIG. 1, a bucket 10, consisting of front, rear and side walls and a floor, 11, 12, 13, and 14 respectively, is carried at the end of a lift boom 15. Operating controls 16 are conventionally mounted on the rear wall of the bucket 10. As illustrated, an organizer 20 designed in accordance with the invention is mounted on the front wall of the bucket 10.

Figure 2:
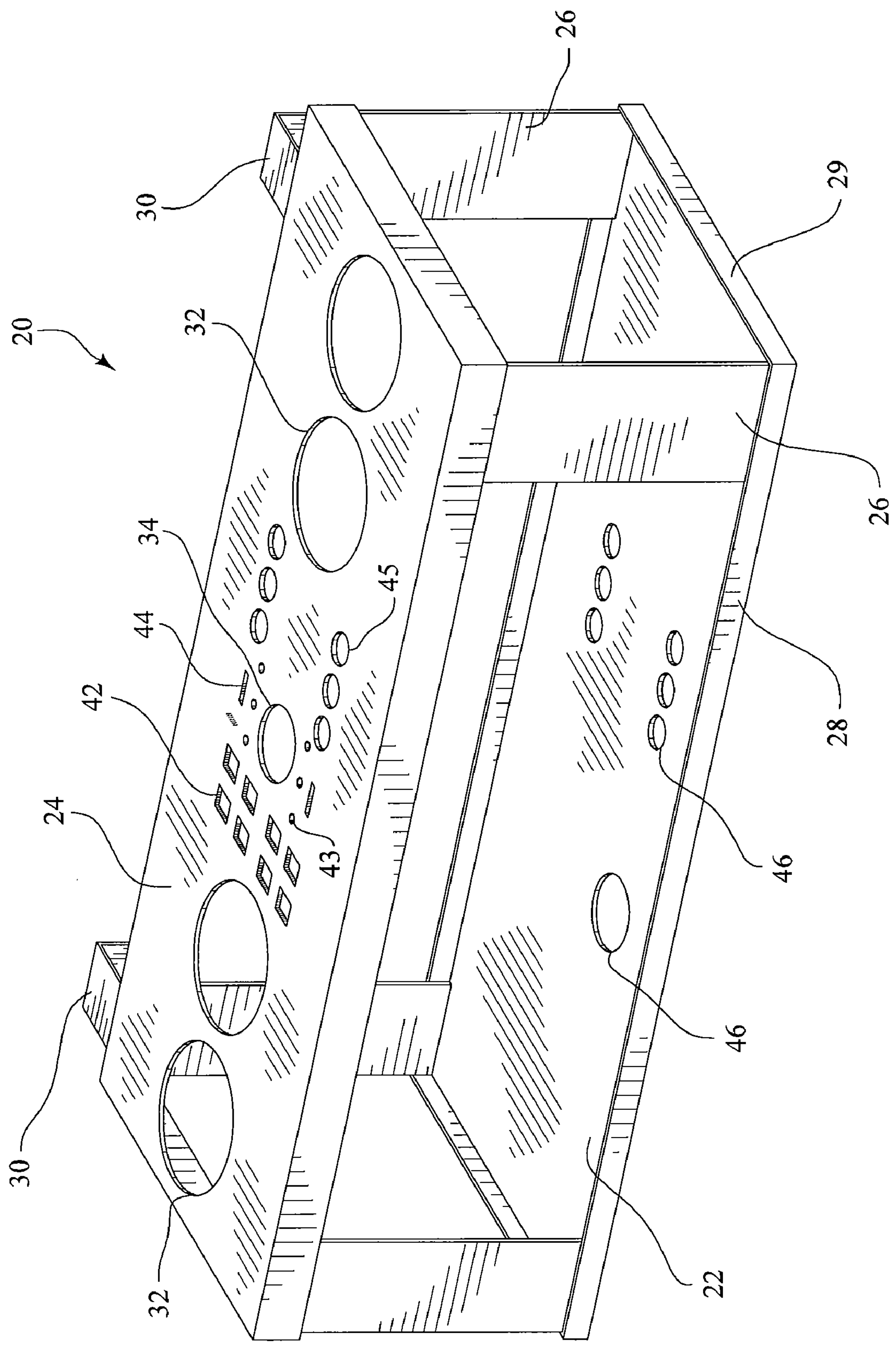
FIG. 2 is a perspective view of the organizer of the invention.
Figure 3:
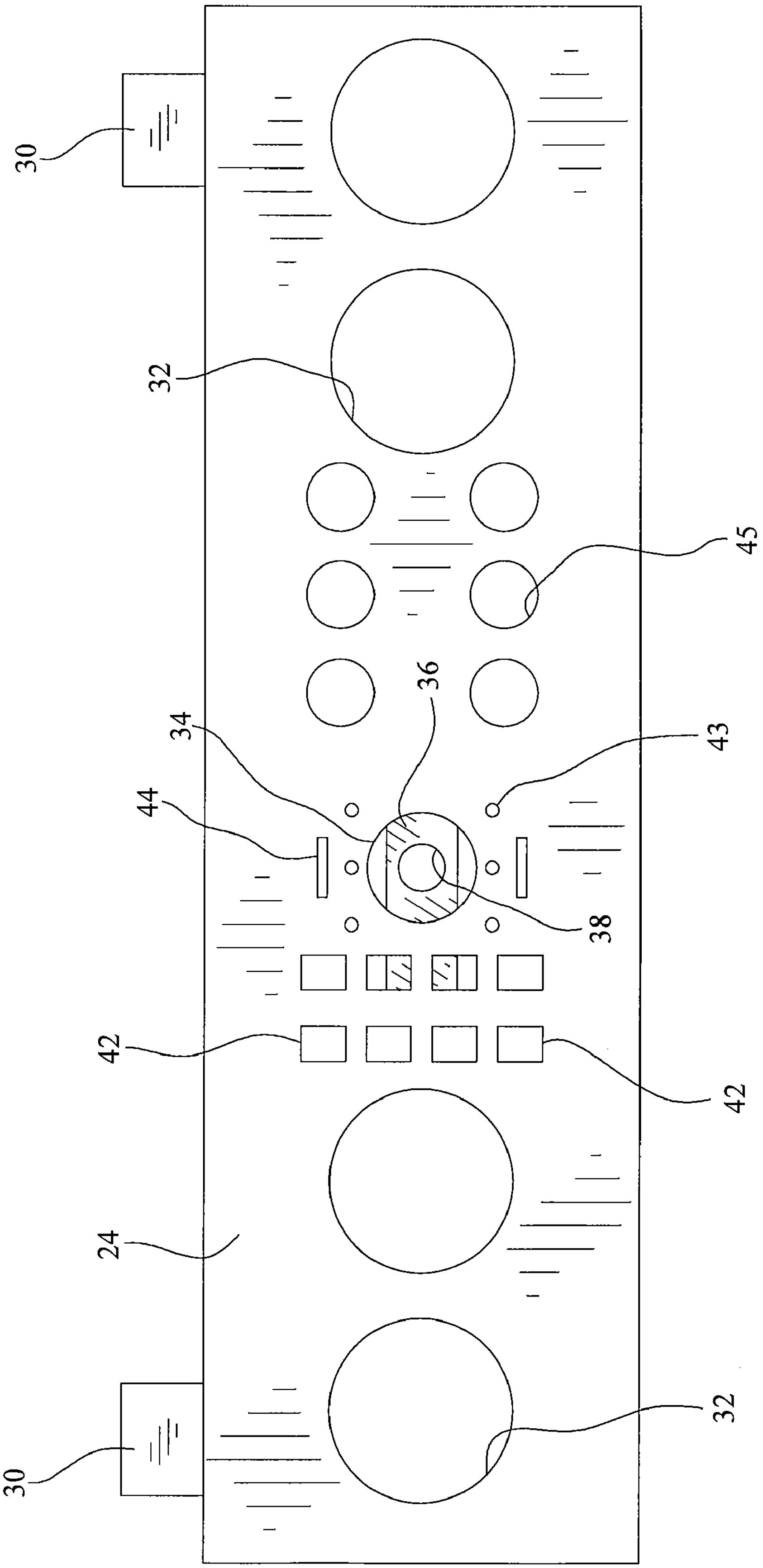
FIG. 3 is a top plan view of the organizer of FIG. 1.

As is most clearly shown in FIGS. 2 and 3, the organizer 20 comprises a container having a bottom wall 22 that defines the floor of the organizer 20 and a support plate 24 spaced apart by upright members 26 secured at each corner of the bottom wall 22 and the support plate 24. The front, rear, and side faces of the organizer 20 are illustrated as being open for clarity of illustration to show the features of the tool organizer 20. U-shaped brackets 30 are fixed on the upright members 26 on one lateral face of the organizer 20 to support the organizer 20 on an upper edge of the bucket 10. It will be understood that the organizer 20 can be supported in the bucket 10 in other ways such as by bolts or clamps.

Figure 4:
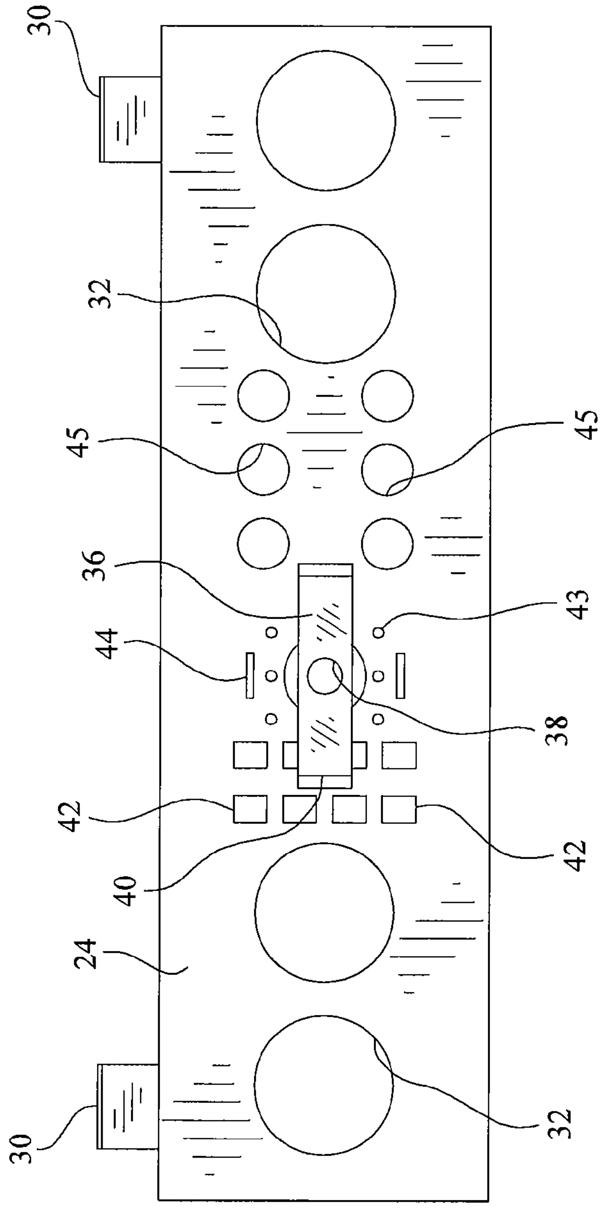
FIG. 4 is a plan view of the support panel of the organizer of FIG. 2 as viewed from its lower surface.
Figure 5:
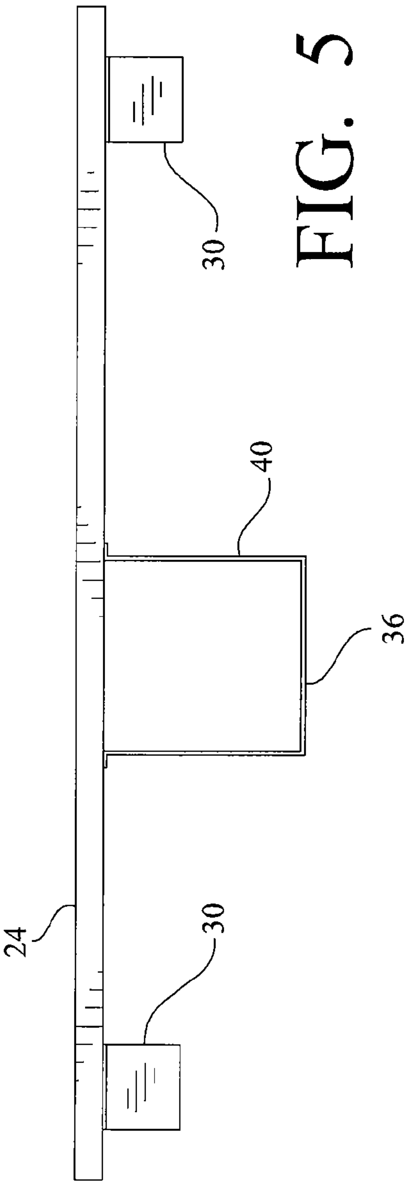
FIG. 5 is a front view of the support panel of the organizer of FIG. 2.

The support plate of 24 of the organizer 20 is provided with a series of openings configured for retaining various tools and hard goods in an organized, secure and readily available manner. As illustrated in FIG. 4, large openings 32 are provided in the support plate 24 for receiving containers to hold loose items such as nuts, bolts, nails and the like. Preferably there are four such large openings 32, two at each end of the support plate 24. These openings 32 are preferably circular so that a cylindrical container, such as a small pail can be disposed in the openings 32 for miscellaneous loose items. An opening 34 for receiving a power tool such as a drill or impact hammer is formed in the median portion of the support plate 24. A lower support member 36 is aligned in spaced relationship below the power tool opening 34 to span the power tool opening and to define a supporting floor. An aperture 38 is provided in the lower support member 36 to receive any extending portion of a power tool thus to secure the power tool both at the power tool opening 34 at the support plate 24 and at the lower support member 36. The lower support member 36 includes a pair of upwardly extending arms 40 having free ends. The free ends of the arms 40 are secured to the lower surface of the support panel 24 to maintain the lower support member 36 in a spaced relation and alignment with the power tool opening 34. In the alternative, the power tool opening 34 can also be used as a holder for containers for liquids in which case the floor defined by the bracket serves to support the bottom of the container. A plurality of openings 42, 43, 44, and 45 are arranged about the power tool opening 34 for hand tools. For example, openings 42 are configured to receive wrenches, pliers and the like. Openings 43 are designed for tools with rod shaped extending members such as, for example, screw drivers and punches. Openings 44 are adapted to secure tape measures and the like. Openings 45 are configured to receive and secure tools such as bolt cutters. As shown, the openings 42, 43, 44, and 45 are configured both in size and shape for the items they are designed to secure. It will be understood that a wide variety of different tools can be received and secured in any one of the openings 42, 43, 44, and 45.

Figure 6:
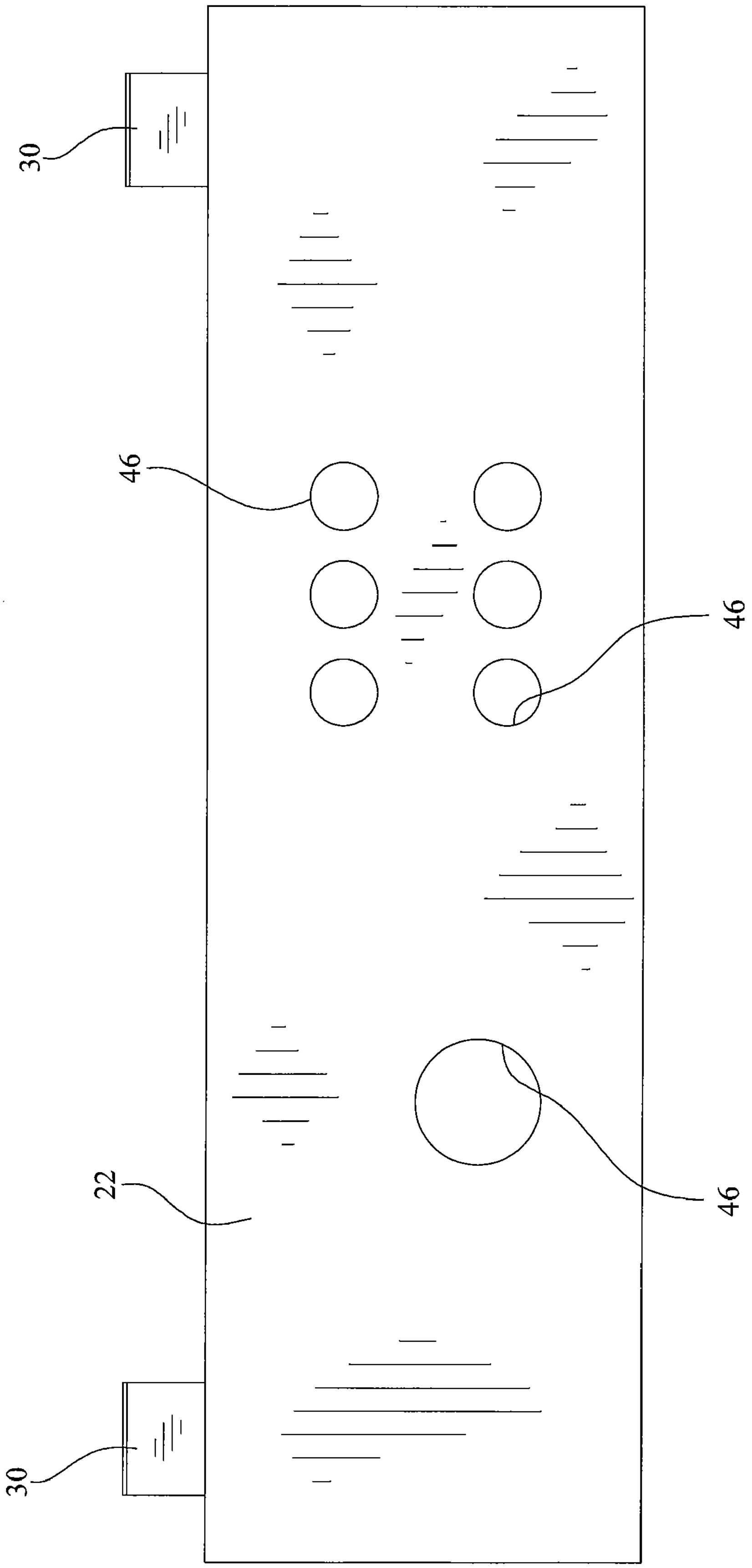
FIG. 6 is bottom plan view of the organizer of FIG. 1.

Referring to FIG. 6, the bottom wall 22 of the organizer 20 is provided with openings 46 that are aligned to correspond with the openings, for example, the openings 32, 45 in the support plate 24. The corresponding openings 46 in the bottom wall 22 are aligned with the openings in the support plate 24 to accommodate items that are longer than the spacing between the support plate 24 and the bottom wall 22 of the organizer 20, for example items such as bolt cutters or pruning shears or similar tools with long handles.

Figure 7:
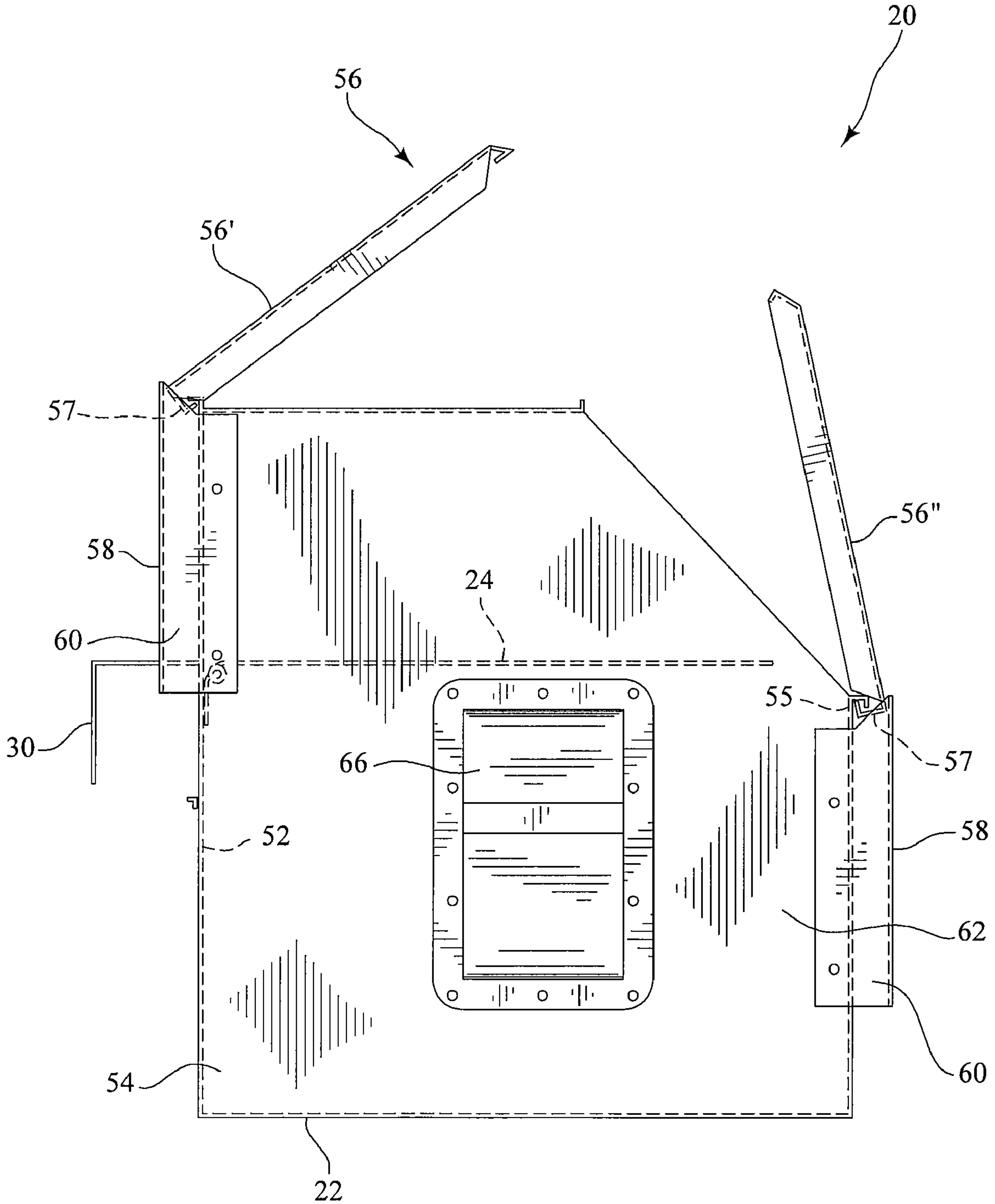
FIG. 7 is a side view of an embodiment of the invention showing the top wall sections partially open.
Figure 8:
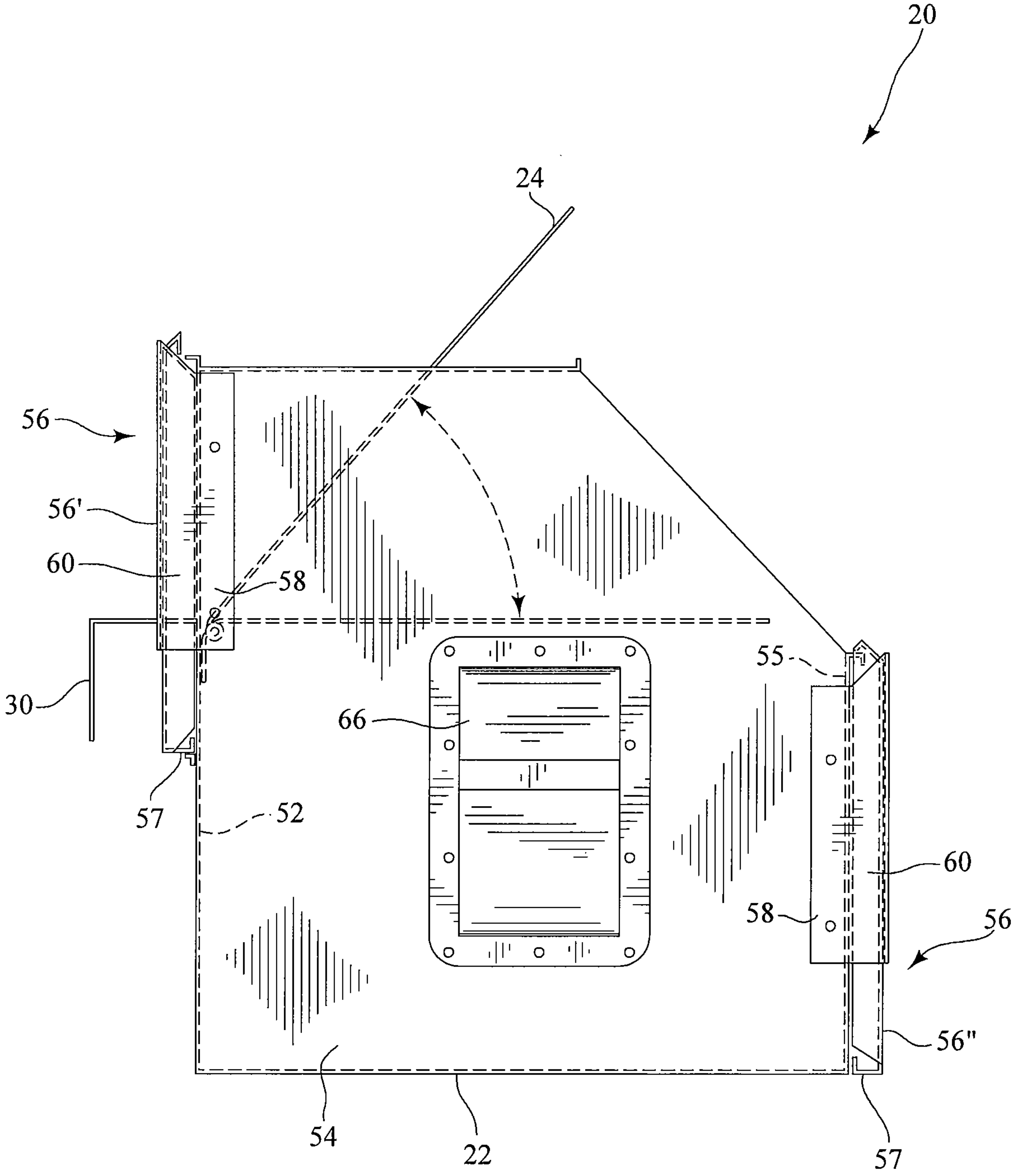
FIG. 8 is a side view of the embodiment of FIG. 7 showing the top wall in the fully open and retracted mode.

Referring to FIG. 7 and FIG. 8 there is shown the edges of a top wall 56, the bottom wall 22, a rear wall 52 and one side wall 54. Handles 66 are provided on each of the side walls 54. The top wall 56 is divided into two sections 56' and 56". Each section 56' and 56" is adapted hinged connection to rear wall 52 and the front wall 55 respectively. The transverse edges of the sections 56' and 56" are inwardly upwardly turned to engage corresponding turned edges of the rear wall 52 and the front wall 55 to form hinges 57 that allow the sections 56' and 56" to pivot between a closed position and an open position and which release to permit section 56' to retract along the rear wall 52 and the section 56" to retract along the front wall 55 (FIG. 8). L-shaped brackets 58 are disposed on the side walls 54 of the organizer 20 adjacent the rear wall 52 and the front wall 55 to form channels 60 to guide the side edges of the sections 56' and 56" as the sections are retracted. With the top wall 56 in the fully open and retracted position, the upper face of the tool organizer 20 is completely open for easy access to the tools and other items contained in the tool organizer 20.

In one embodiment the tool organizer 20 is readily converted to a tool box for storage and securing of tools when not being used. In this embodiment, most clearly shown in FIG. 8, the support plate 24 is pivotally attached to the side walls 54 or the rear wall 52. In this manner the support plate 24 can pivot upwardly to an essentially vertical position to fully expose the bottom wall 22. The tools and the respective hard goods container can be placed in the interior of the tool organizer 20 and the support plate 24 and top wall sections 56' and 56" returned to the fully closed position for securing the tools and other items in the tool organizer 20 as a tool box.

Figure 9:
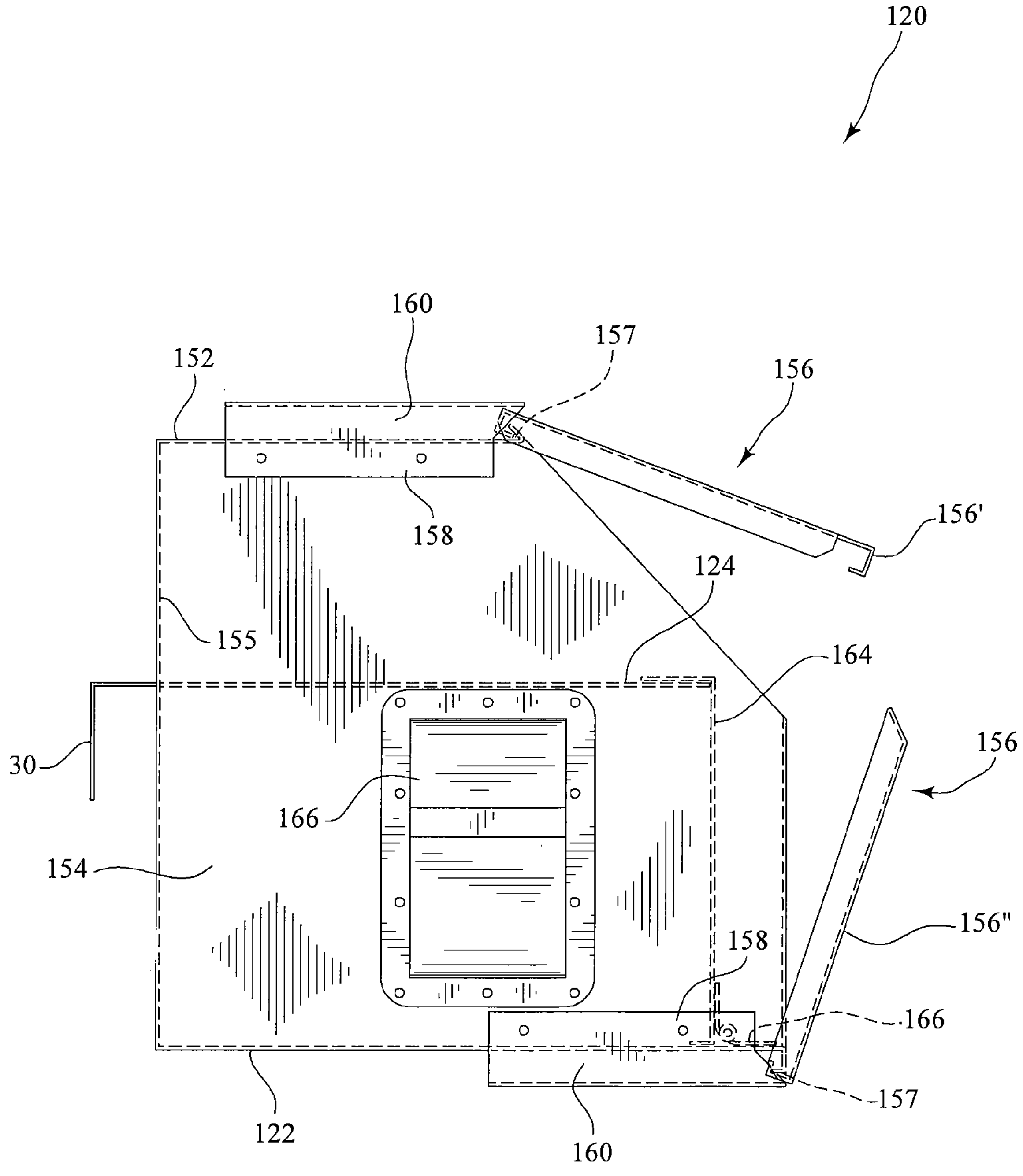
FIG. 9 is a side view of an another embodiment of the invention showing the front wall partially open.
Figure 10:
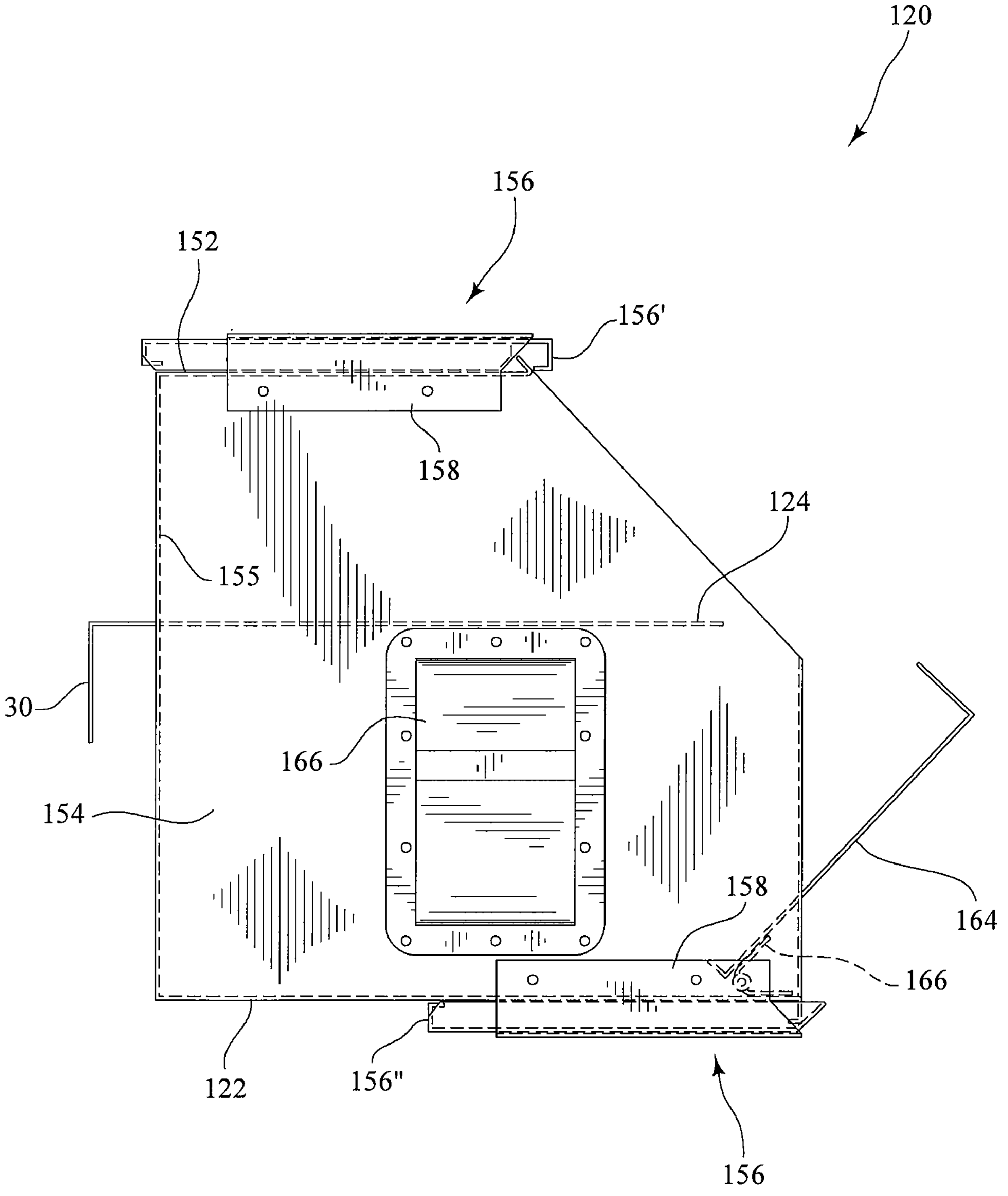
FIG. 10 is a side view of the embodiment of FIG. 9 illustrating the front wall fully open and retracted.

In another embodiment of the invention, illustrated in FIG. 9 and FIG. 10, the tool organizer 120 defines a top wall 152, rear walls 155, side walls 154, a bottom wall 122, and a pivotally mounted front wall 156 that can be opened to gain access to the interior of the organizer 120 through the front face. In the embodiment shown, the front wall 156 is divided into two sections 156' and 156". The top section 156' is hinged at its upper edge transverse edge to the forward transverse edge of the top wall 152, while the lower section 156" is hinged at its lower transverse edge to the forward transverse edge of the bottom wall 122 of the organizer 120. In this manner, one or both of the top section 156' or the lower section 156" may be opened if desired. The transverse edges of the sections 156' and 156" are inwardly upwardly turned to engage corresponding turned upper transverse edge of the top wall 152 and the forward transverse edge of the bottom wall 122 to form hinges 157 that allow the sections 156' and 156" to pivot between a closed position and an open position and which release to permit the top section 156' to retract over the top wall 152 and the lower section 156" to retract under the bottom wall 122 Upwardly turned L-shaped brackets 158 re disposed on the side walls 154 of the organizer 120 adjacent the front edges thereof and cooperate with the top wall 152 an the bottom wall 122 to define channels 160 along which the side edges of the sections 156' and 156" slide to retract the section when it is in the open position (FIG. 10). An interior container is formed in the tool organizer 120 by the support panel 124, the bottom wall 122 and the side walls 154. The front of the interior container is closed by a front panel 154 that is connected to a U-shaped hinge 166 for pivoting between open and closed position.

From the foregoing and can be seen that the tool organizer of the present invention serves to retain tools and miscellaneous items required to carry out a work project in or from a confined area such as the bucket of a lift boom in an organized and efficient manner. Tools and other miscellaneous loose items are retained in the tool organizer conveniently in the reach of the worker and off of the floor of the bucket or similar confined space where they can interfere with the worker. In this matter of the work environment is made safer and work is carried out more efficiently than is the conventional situation where tools are lying loosely near the feet of the workman. The tool organizer is readily converted into a toolbox so that tools can be easily secured and stored at the completion of the workday or work project. The tool organizer is readily portable for easy installation and removal from a lift boom bucket or similar confined worksite.

It will be understood that various arrangements which lie within the spirit and scope of the invention other than those described in detail in the specification will occur to those persons skilled in the art. It is therefore to be understood that the invention is to be limited only by the claims appended hereto.

I claim:

1. An organizer for securing tools and hard goods particularly in environments where working space is limited, said organizer comprising top, front, rear and side faces closed by panels to define top, front, rear and side walls respectively and a bottom wall, said top, front, rear and side walls each defining transverse edges and side edges, said bottom wall collaborating with said top, front, rear and side walls to define a container having an interior, a support plate defining an upper and a lower face in said interior in spaced relationship to said bottom wall, a plurality of openings in said support plate for retaining tools and hard goods in an organized and secure manner, at least one of said top and said front wall panels having inwardly turned transverse edges for hinged connection to a corresponding transverse edge of one of said rear wall panel and said bottom wall respectively for movement between a closed position over at least one of said top and front face of said container and an open position thereby to expose at least one of said top face and said front face for access into said interior of said container, said transverse edge of at least one of said top panel and said front panel being separable from said corresponding transverse edges of at least one of said rear wall panel and said bottom wall to allow at least one of said top panel and said front panel to retract and lie in a plane parallel to at least one of said rear wall panel and said bottom wall when in the open position.

2. The tool organizer of claim 1 wherein said top panel comprises a first section having a transverse edge pivotally connected to a corresponding transverse edge of said rear panel and a second section having a transverse edge adapted for hinged connection to a corresponding transverse edge of said front panel, in a closed position said first section and said second section of said top panel overlying said upper face with transverse edges of said first and second sections opposite the corresponding transverse edges of said rear panel and said front panel adapted for hinged connection being immediately adjacent one another, and said first section and second section pivoting away from one another about an axis defined by said transverse edges adapted for hinged connection thereby to expose said top face of said container.

3. The organizer of claim 1 wherein said side edges of at least one of said top wall panel and said front wall panel are slidably supported during retraction by brackets disposed on said side walls of said organizer.

4. The organizer of claim 1 wherein said front wall is divided into a first and a second section, each said section defining transverse edges and side edges, said first section being pivotally connected at one transverse edge to a forward edge of said top wall and said second section is pivotally connected at one transverse edge to a forward edge of said bottom wall of said organizer.

5. The organizer of claim 4 wherein one transverse edge of said first and second sections is inwardly upwardly turned to engage corresponding turned front edges of said top wall and said bottom wall and cooperate to form a transverse hinge to allow said first and second sections to pivot between a closed position and an open position, said transverse edges being separable from said front edges of said top and bottom walls to allow said first section to retract and lie over said top wall and allow said second section to retract and lie under said bottom wall.

6. The organizer of claim 1 wherein said support plate is pivotally attached to said side walls of said container for movement between a closed position and an open position for access to said bottom wall of said container.

7. The organizer of claim 1 further including means for attaching said organizer to a wall of a boom lift bucket.

* * * * *